United States Patent Office 3,342,372
Patented Sept. 19, 1967

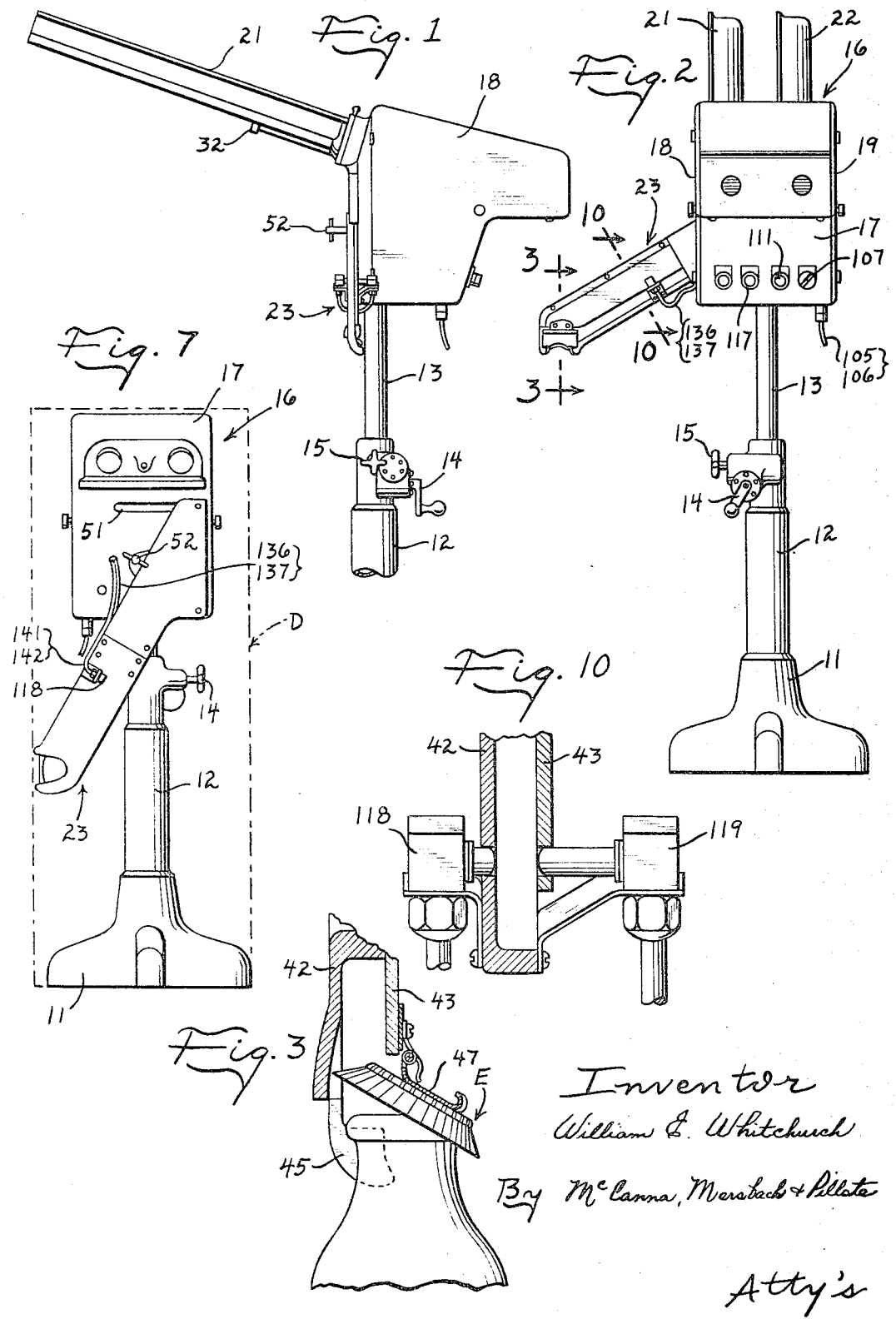

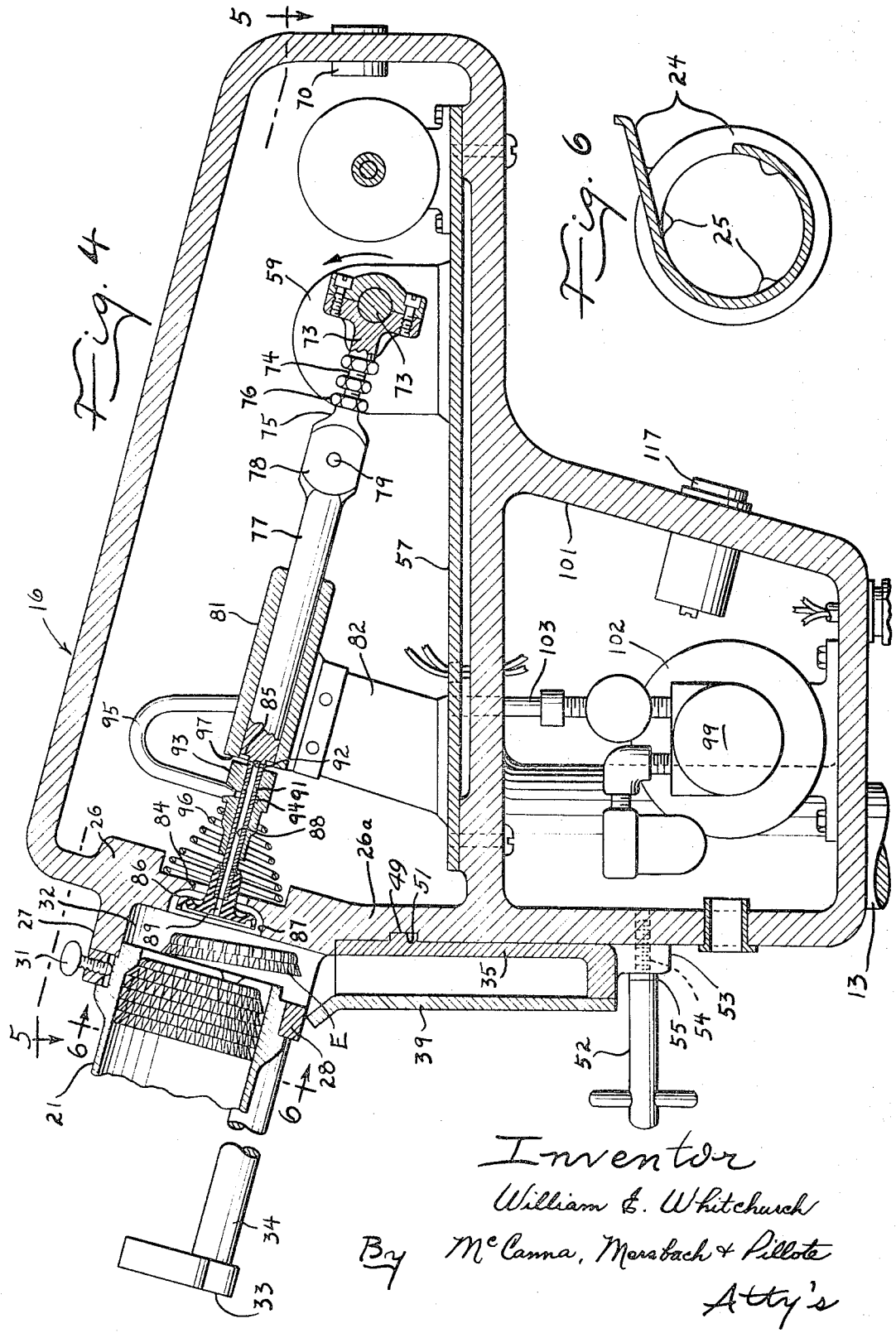

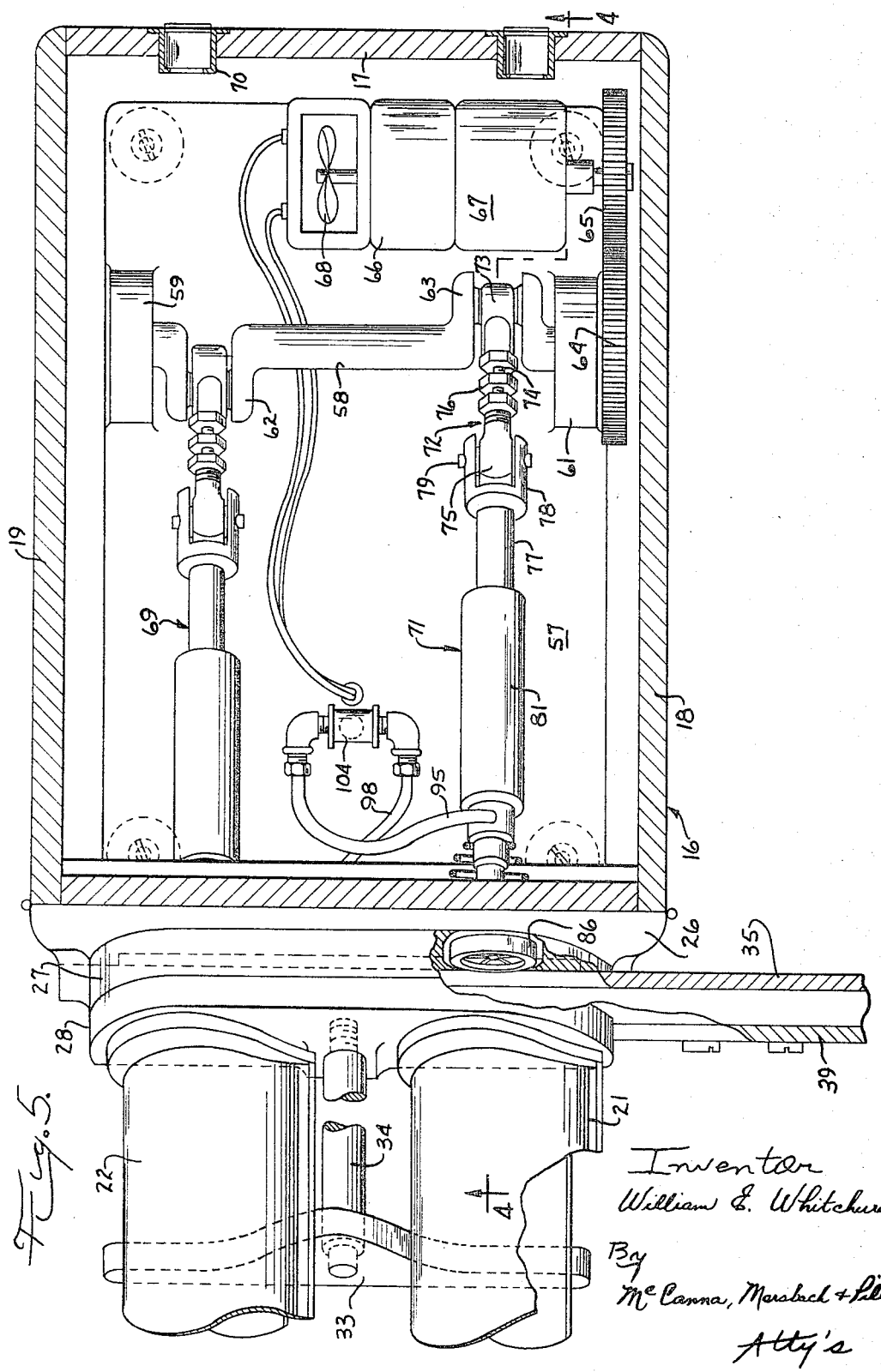

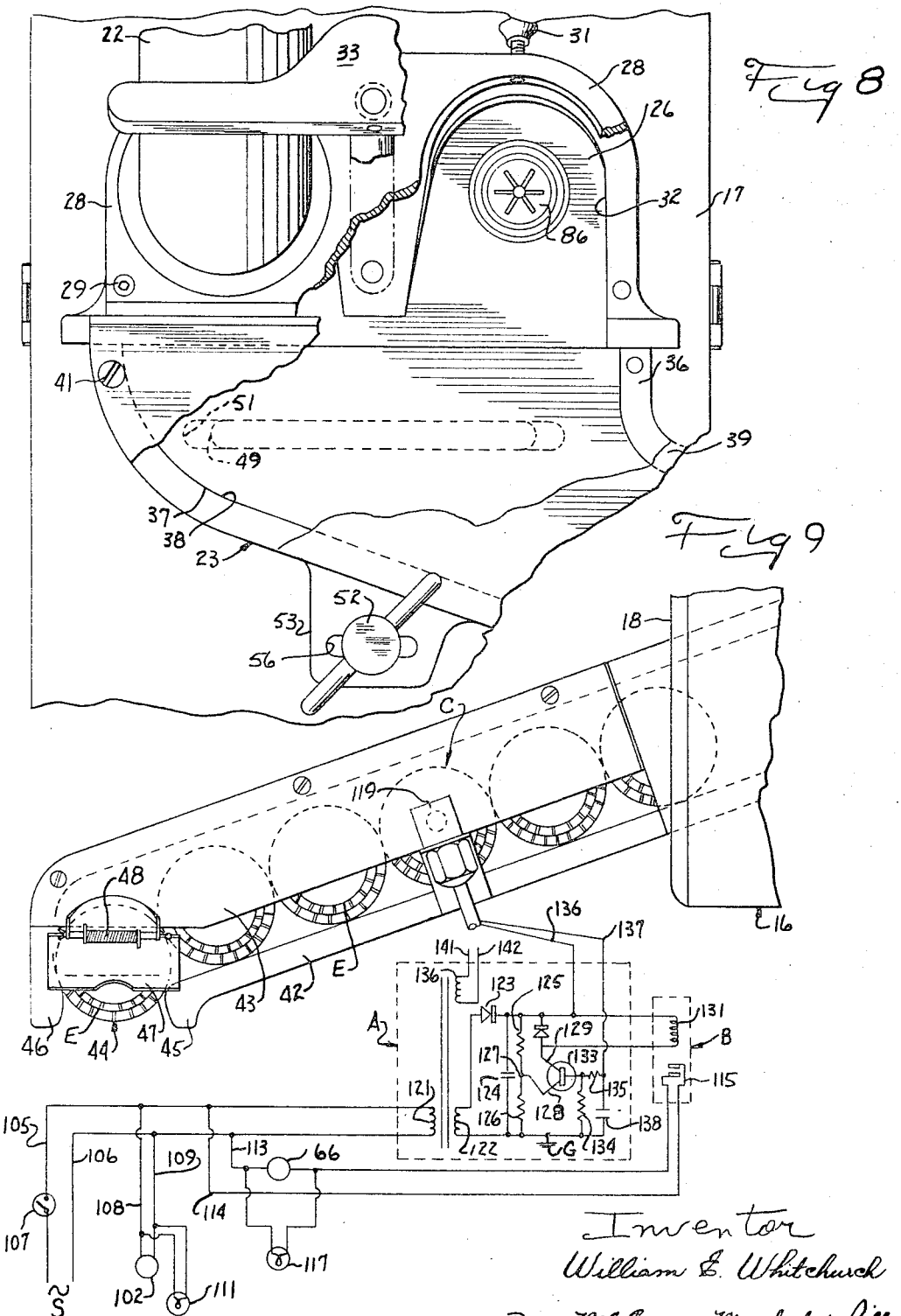

3,342,372
BOTTLE CAP FEEDER
William E. Whitchurch, Belvidere, Ill., assignor to Champion Papers Inc., Hamilton, Ohio, a corporation of Ohio
Filed May 18, 1964, Ser. No. 368,021
9 Claims. (Cl. 221—13)

ABSTRACT OF THE DISCLOSURE

A portable unit having an inclined chute for gravity feed of bottle caps, a pair of magazines, and reciprocable suction cups for removing the caps from the magazines and depositing in the chute. A self-contained drive mechanism operates the suction cups and is controlled by a photo-electric device responsive to absence of a cap at a point along the chute.

BACKGROUND

This invention relates to improvements in hooding apparatus for applying bottle caps, particularly hood caps, to bottles, such as milk bottles.

Hooding apparatus of the type herein described are mostly employed in the filling and capping of glass milk bottles for the purposes of applying hood type caps to the heads of milk bottles prior to capping so that as the bottle comes into the capping station the cap is loosely resting on the top of the bottle in a position to be crimped around the head of the bottle at the capping station. A common type of cap is formed from laminated paper and aluminum foil. Some are quite thin, light in weight, and easily distortable by mechanical forces and consequently present problems in handling particularly at high speeds due in part to their light weight and high surface area which retards rapid movement of the caps. These caps are usually supplied by the manufacturer in stacks enclosed within paper tubes, the stacks usually being removed from the tubes and placed in the magazine of the hooding apparatus.

A number of different systems have been employed to remove the individual caps from the tubes and apply them to the bottles subsequent to filling and prior to capping. In most, if not all, instances the rate of feed has been made dependent upon and responsive to the passage of bottles through the filler or along a conveyer between the filler and the capper. This has not been entirely satisfactory even on low speed fillers because the number of caps required is not always identical with the number of bottles. Another objection is that the system lacks versatility since it requires that the hooder be a part of the filler and capper or, where portable and usable in connection with different fillers and cappers that it occupy a precise location with respect to the filler so as to be responsive to the passage of bottles.

The apparatus herein shown is an improvement over that shown in the Patent to F. A. Ray, U.S. Patent No. 2,734,674. While the apparatus shown in that patent has been a successful commercial machine it has certain of the objectionable features mentioned above. Furthermore these problems have been accentuated and others introduced by the advent of higher speed filling and capping machines.

SUMMARY OF THE INVENTION

The invention provides a new and useful construction whereby the apparatus can be quickly and easily transported or stored, or wherein generally all of the moving parts can be readily removed and replaced. The apparatus is versatile and adapted to high speed operation.

An important object of the invention is to provide a hooding device for applying relatively thin, light weight caps to the heads of milk bottles as they pass between a filler and a capper, at a higher rate of speed than has heretofore been found practical.

Another object is to provide a hooding device having a feed chute in which a supply of caps is maintained in the ready position together with improved means for extracting the caps from storage containers and depositing the same into the chute.

A further object of the invention is to provide a self contained bottle hooding apparatus of greater versatility which may conveniently be mounted on its own independent pedestal and placed beside a conveyer at any convenient location in the path of bottles moving between a bottle filling and a capping apparatus and which is devoid of any control or driving connections between the hooding apparatus and the conveyer of bottles.

Another object is to provide a hooding device of the type having a feed chute, a plurality of magazines for caps, and suction cups for removing the caps from the magazines to the feed chute, wherein the suction cups are driven by an electric motor controlled by a photo-electric device energized in response to the absence of a cap at a preselect position in the feed chute.

Other objects and advantages will be specifically mentioned hereinafter or will become apparent from the following description and accompanying drawings in which:

FIG. 1 is a side elevational view of a bottle hooder made in accordance with this invention.

FIG. 2 is a front elevational view of the same apparatus.

FIG. 3 is a partial sectional view taken on the line 3—3 of FIG. 2 showing the manner in which the caps are removed from the chute in response to the passage of a bottle thereby.

FIG. 4 is a vertical sectional view on the broken line 4—4 of FIG. 5.

FIG. 5 is a partial sectional view taken along the line 5—5 of FIG. 4.

FIG. 6 is a sectional view on the line 6—6 of FIG. 4.

FIG. 7 is a rear elevational sectional view of the apparatus with the magazines removed and the cap chute rotated to an inoperative position at which it may be placed for shipping or storage.

FIG. 8 is in part a rear elevational view of the casing showing the manner in which the feed chute is mounted on the body.

FIG. 9 is a wiring diagram of the apparatus together with a portion of the feed chute having the lamp and photocell for controlling the extractor mechanism.

FIG. 10 is a section on the line 10—10 of FIG. 2.

The embodiment of the invention as herein shown comprises a casing or body adapted to be mounted adjacent to a bottle conveyer and having a feed chute projecting laterally therefrom over the conveyer, the chute being inclined so that hooded caps deposited in the upper end of the chute at the casing will roll edgewise down to the lower end thereof to be retained for contact by the bottles and removed from the end of the chute in a known manner as shown in FIG. 3. Extracting mechanism is provided in the casing for removing the caps from magazines carried on the casing. Self-contained control and driving means are provided for maintaining a supply of caps in the chute regardless of the rate of withdrawal by the bottles.

Referring to the drawings, the apparatus of this invention preferably includes its own independent pedestal, although it will be apparent that the pedestal could be dispensed with and the remainder of the apparatus secured in some other appropriate manner as a permanent part of a bottle filling and capping installation. However, in its most useful form the invention includes a heavy base 11 suitable for maintaining the device in its proper upright position upon the floor. A post 12 rises from the pedestal and into this post a shaft 13 is disposed in telescopic relation. A gear mechanism is supplied for elevating and lowering the shaft so that the exposed lower end of the chute may extend over and be properly aligned with the tops of bottles moving on a conveyer not shown. This gear mechanism may be conventional nature including a gear rotatable by a handle 14 arranged to drive a gear or rack not shown, a clamping screw 15 being used to clamp the shaft at the selected elevation.

Affixed to the top of the shaft 13 is a casing generally indicated by the numeral 16 having a body portion 17 open at its sides to provide access openings and doors 18 and 19 to inclose the interior. Carried on the casing are a pair of cap retaining magazines 21 and 22 in the form of tubes and a cap chute generally indicated at 23. Each magazine as shown in cross section in FIG. 6 is preferably provided with a side gap or opening 24 extending the length of the tube and permitting ready access to the caps stacked within the tube. At the lower end of each magazine inwardly extending projections such as shown at 25 are provided for restraining the hooded caps from falling out of the lower end of the tube. Formed on the sloping front wall of the casing is a boss as indicated at 27 (FIGS. 4 and 8) and mounted across the boss is a magazine retainer 28 secured to the wall by screws 29, the retainer having openings for the reception of the ends of the magazines retained therein by thumb screws 31. The retainer 28 may be interchangeable to accept magazines of different diameters for different sized caps. The boss 27 and retainer 28 support the ends of the magazines in spaced relation to the casing wall 26 to provide extraction chambers 32 (FIG. 4) opposite the dispensing ends of the magazines. Additional support is provided by cradle 33 carried on a rod 34 threaded into the casing wall. It is apparent that caps may be withdrawn from the magazines alternately and dropped into the upper end of the chute to roll down the chute to the lower end or until obstructed by caps already accumulated in the chute. The magazines are disposed at an angle such that the stack of nested caps are constantly urged by gravity into a position against the projection 25 at which point the lower cap of the stack may be engaged by extracting mechanism presently to be described.

The chute, indicated generally at 23, inclues a main channel member 35 provided with upper and lower flanges 36 and 37 and having an enlarged chamber 38 at its upper end. A cover 39 is provided for the upper portion of the chute secured to flanges 36 and 37 by screws 41 and affording access to the interior. Below the cover 39, the chute is formed of a lower channel member 42 connected to the channel member and provided with a cover 43, preferably of transparent material, which likewise may be secured to the flanges by suitable screws.

The dispensing end of the chute has a bottom opening 44 formed by a pair of spaced fingers 45 and 46 on which the lowermost cap rests in, the balance of the caps in the chute bearing against atnd being retained by this cap. These fingers allow a partial exposure of the cap so that the head of a bottle passing along a conventional conveyer may engage and slide the cap off the fingers as shown in FIG. 3. A hinged plate 47 and light spring 48 normally retains the cap in vertical position but permits it to be withdrawn as shown, whereupon the caps in the chute roll down to new positions.

The chute is secured to the casing so as to extend laterally and downwardly as shown in FIG. 2, the inclination being such that the caps will roll down along the lower surface of the chute edgewise to the position of FIG. 9. For mounting and aligning the feed chute on the casing 16 there is provided an interfitting clamp means which includes a rib 49 into an elongated recess 51 in the vertically disposed front wall 26a of the casing, as best shown in FIGS. 4 and 8. A clamp screw 52 passes through an ear 53 integral with the channel member and has a reduced threaded inner end 54 for reception in a threaded hole in the casing wall providing a shoulder on the screw adapted to bear against a washer 55 between the projection and the shoulder to retain the chute in adjusted position on the body. As shown in FIG. 8 the recess 51 is longer than the rib 49 and the ear 53 has an elongated slot 56 through which the threaded portion of the clamping screw extends. Therefore, the feed chute may be shifted a limited distance to right or left, viewing FIG. 8, in order that its delivery end may be properly aligned with the bottle carrier in the filling and capping apparatus. This novel manner of mounting the chute on the body serves a further important purpose. It will be noted that in a portable unit such as shown, the chute must be of such length as to extend outwardly over the bottle conveyer. This fact brings about space problems where the hooder is in storage, temporarily out of use or in packing and shipping. This mounting construction enables the chute to be readily shifted to the position shown in FIG. 7. To accomplish this the screw 52 is loosened, the rib 49 is withdrawn from the recess 51 and the feed chute is rotated about the screw 52 to the position shown in FIG. 7, without disconnecting the electrical connections presently to be described. The screw 52 may thereafter be tightened and the chute firmly clamped with its lower end extending downwardly and laterally as shown in FIG. 7 to provide a compact arrangement for storage or for insertion in a shipping carton as indicated at D in FIG. 7.

Mechanism is provided for extracting the caps from the magazines and dropping them into the feed chute which mechanism is largely positioned within the casing. This mechanism includes a mounting plate 57 disposed within the casing 16, removably secured by any suitable means such as screws, as shown in FIG. 4 and this plate carries the extracting mechanism, thereby permitting the entire mechanism to be readily removed or replaced.

A crank shaft 58 (FIGS. 4 and 5) is supported at its ends in suitable bearings carried in pillow blocks 59 and 61 secured to the plate 57 and is provided with cranks 62 and 63 disposed at 180 degrees with respect to each other. The shaft is rotated by gears 64 and 65 from an electric motor 66, a gear reduction 67 being interposed between the motor and gears. A fan blade 68 may be mounted on the motor shaft to provide cooling air circulation within the casing through ventilation openings 70. Connected with the cranks 62 and 63 and driven thereby are two extractor assemblies 69 and 71 each comprising a connecting rod 72 (see FIG. 4) comprising a bearing 73 mounted on the cranks, the bearing having a threaded bore for the reception of a threaded stem 74. The opposite end of the stem is threaded into a knuckle 75 and the stem carries lock nuts 76 to secure the stem in adjusted positions and enable adjustment of the length of the connecting rod. The knuckle 75 is connected to a suction rod 77 by means of a yoke 78 on the suction rod and a pivot pin 79, thereby enabling the crank to drive the suction rod in straight line axial movement. The suction rod 77 is supported for reciprocation in a sleeve bearing 81 supported by a bracket 82 mounted on the plate 57 which supports and guides the suction rod in a position substantially coaxial with the magazine 21.

On the forward end of suction rod 77 is a tubular stem 83 which projects through an opening 84 in the casing wall 26 providing a shoulder 85 at the end of the suction rod. A suction cup 86 of known construction is mounted on the free end of the stem, the wall 26 being recessed at 87 for the reception of the cup in the retracted position of the cup. The stem has a central air duct 88 communicating with a duct 89 in the cup for applying reduced pressure to the contact surface of the cup in the conventional manner. The stem 83 is provided with a pair of longitudinally spaced ports 91 and 92 passing through both walls of the stem. Surrounding the stem and slidable thereon is a sleeve valve 93 having an internal annular groove 94 and a port communicating with a flexible air hose 95 connected to a vacuum pump. A compression spring 96 bears against the casing wall 26 and against the sleeve valve to normally urge the sleeve against the shoulder 85 of the suction rod.

In FIG. 4 the extractor assembly is shown in the retracted cap releasing position. In this position the crank 73 is rearwardly disposed and the shoulder 85 of the suction rod 79 is disposed within the bearing 81. In this position the end of the sleeve valve 93 abuts against the end of the bearing and the port 92 communicates with atmosphere through grooves or vents 97 in the end of the bearing, allowing air to enter the suction cup through the duct 88. The annular groove 94 is out of registery with the port 91. As the crank 73 rotates, the suction rod 77 is moved forward, bringing the shoulder 85 against the sleeve valve and simultaneously moving the port 92 into the sleeve valve to close the opening to atmosphere and also moving the port 91 into registration with groove 94, thereby evacuating air from the suction cup. Continued forward movement of the suction rod carries the sleeve valve with it, compressing the spring and bringing the suction cup against the bottom cap E of the stack in magazine 21, as the crank reaches a position 180° from that shown in FIG. 4. At this point the bottom cap of the stack is drawn tightly against the suction cup in response to the reduced pressure tn the cup. Upon continued rotation of the crank the suction rod, sleeve valve, and suction cup move as a unit toward the retracted position, drawing the bottom cap from the end of the magazine pass the projections 25. When the parts approach the position of FIG. 4 the ports 92 are uncovered allowing the entrance of air and the ports 91 are covered terminating evacuation. This releases the cap which falls, as shown, into the chute. The suction cup removes wholly into the recess 87 so that in the event that the cap should adhere to the cup it will engage the face of the wall 26 and be released.

The extracting assembly 69 is constructed and functions in the same manner as in assembly 71 except, because of the angular relationship of the cranks, caps are successively extracted from magazines 21 and 22 in a continuous cycle so long as the feed motor operates. A flexible air hose 98 similar to the air hose 95 connects the sleeve valve of assembly 69 to a vacuum pump.

Sub-atmospheric pressure for operating the suction cups is provided by a vacuum pump 99, which may be of any appropriate type, located in the chamber 101 of the casing (FIG. 4) and driven by an electric motor 102 directly connected to the pump. The intake of the pump is connected to the sleeve valves 93 of the extractor assemblies through a pipe 103 having a T connection 104 to which the air hoses 95 and 98 are connected. As will be apparent from the wiring diagram presently to be described, the motor 102 is energized and drives the pump at all times when the main switch is closed to constantly provide a condition of sub-atmospheric pressure to the sleeve valves.

The electrical control system for the cap feeding apparatus is schematically illustrated in FIG. 9. As shown, power is supplied from a source S through conductors 105 and 106, under the control of a main start switch 107. The motor 102 of vacuum pump 99 is directly connected to the conductors 105 and 106 as through conductors 108 and 109 so that the vacuum pump operates continuously when the start switch is closed and an indicator lamp 111 is conveniently provided to indicate when the vacuum pump is in operation. The feed motor 66 for operating the vacuum cups, however, is intermittently operated under the control of a relay B located in the chamber 101. As shown, the feed motor 66 is connected through conductors 113 and 114 to the conductors 105 and 106 and to a normally open relay operated switch 115. As indicator light 117 is preferably provided to indicate when the feed motor is in operation.

The feed motor is energized when the number of caps in the magazine falls below a pre-selected minimum and, preferably is so controlled that it will feed more than one cap each time it is energized to thereby reduce the number of times the feed motor must start and stop during operation of the cap feeder. For this purpose, a sensing means, in this instance, comprising a light source 118 (see FIG. 10) and a photocell 119 are provided on the magazine at a point spaced somewhat from the discharge end of the magazine so that the light from the source will be cut off from the photocell when the caps fill the magazine to a point adjacent the photocell. A control circuit including relay amplifier designated A in FIG. 9 positioned in the chamber 101 is provided for operating the relay B under the control of the photocell to start the feed motor when the cap supply in the magazine falls below the selected minimum as indicated by the absence of a cap at a control station indicated at C in FIG. 9. This station is located intermediate the dispensing end of the chute and the chamber 32. In the embodiment shown this station is located four caps from the dispensing end and the chute should be long enough to hold four to six caps above this station. This amplifier may be of various different types, but in the embodiment shown, is a transistor amplifier including a transformer having a primary 121 connected to the conductors 105 and 106 and a secondary 122. The voltage across the secondary winding is rectified by a rectifier 123, and filtered by capacitor 124 and applied across a voltage divider including resistors 125 and 126. The tap 127 on the voltage divider is connected to the emitter 128 of the transistor and the collector electrode 129 of the transistor is connected to the relay coil 131. A diode 132 is connected in parallel with the relay coil. The base electrode 133 of the transistor is connected through a resistor 134, to the grounded end of the voltage divider, and the base electrode is also connected through a resistor 135, the photo-conductive type photocell 119 and flexible conductors 136 and 137 to the other side of the voltage divider. The changes in conductivity of the cell 119 due to changes in incident illumination, change the relative potentials of the emitter and base and thus control the flow of current through the relay coil 131 in the collector circuit to energize the relay when the light from the source 118 strikes the photocell. It is preferable to continue operation of the feed motor for a short time after the magazine is filled to the control station to cut off the light to the photocell and for this purpose a timing condenser 138 is connected between the resistor 135 in the base circuit and ground G. The timing condenser builds up a charge during the time the amplifier energizes the relay in response to light striking the photocell, and the timing condenser functions to continue energization of the relay coil for a short time after the light to the photocell is cut off to feed at least several additional caps. With this arrangement, cycling of the feed motor for every cap, is avoided. As shown, the light source 118 is conveniently energized from a different secondary winding 139 on the transformer through flexible conductors 141 and 142.

OPERATION

The hooder is placed into operation, if previously in storage, by moving the cap chute 23 from the inoperative position shown in FIG. 7 to the operative position of FIG. 2 in the manner heretofore described. The apparatus is then moved to hooding position adjacent the line of bottles passing from any conventional filler to a capper. The base 11 may be provided with casters if desired, to facilitate such movement. The chute is then adjusted for elevation by means of the crank 14 and for lateral position, if necessary, by adjustment thereof at its mounting so that the heads of bottles on the conveyer will pass between the fingers 45 and 46 in the manner shown in FIG. 3. A feature of the invention is that the hooding apparatus may be placed any suitable spot along the conveyer since there are no operative connections between the filler capper or conveyer and the hooder. Likewise the hooder can be carried on casters for easy manipulation since virtually no external forces are applied to it during its operation.

Once the magazines 21 and 22 have been filled with caps the unit may be connected to a source of electrical energy and the switch 107 closed. This energizes the vacuum pump motor and the light source 118 and, since no cap occupies the control station C the photocell will be operative to close switch 115 and energize feed motor 66 and thereby effect feeding of caps into the chute. When sufficient caps have been supplied to the chute to fill the same so that a cap occupies the control station, the beam is interrupted and the control means is preconditioned to stop the feed motor after a predetermined time interval necessary to supply several more caps. As the bottles remove the caps from the chute the motor and extractor mechanism, which is geared to supply caps at a rate of speed substantially greater than they can possibly be removed by the bottles, continues to cycle in response to the energization of the photocell.

Having thus described and illustrated a specific embodiment of the invention the scope of the invention is not limited except by the prior art and the appended claims.

I claim:

1. A bottle cap feeder comprising in combination: a casing, a cap chute in an operative position extending laterally and downwardly from the casing at an inclination sufficient for caps to move therealong under gravity, said cap chute and casing having interfitting clamp means for connecting the cap chute to the casing, said interfitting clamp means being arranged for quick release for swinging movement of the entire chute from said operative position to a compact inoperative position for storing, depositing means on the cap chute spaced from the casing for releasably retaining the caps in the cap chute and for depositing the caps on the heads of bottles conveyed past the chute, a cap magazine mounted on the casing and having a dispensing end communicating with the cap chute, extractor means for removing a cap from the cap magazine and for depositing the same in the cap chute, and drive means for driving the extractor means to extract the caps from the cap magazine.

2. A bottle cap feeder as set forth in claim 1 wherein the interfitting clamp means includes: a rib on one of the members consisting of the casing and the cap chute and the other of said members having an elongated recess shaped for receiving the rib therein, and fastening means for retaining the ribs in the recess to hold the cap chute in said operative position, said fastening means being arranged for quick release for removal of the rib from the recess for pivotal movement of the cap chute about the fastening means to the inoperative position.

3. A bottle cap feeder as set forth in claim 1 wherein the drive means includes an electric motor for driving the extractor means to extract the caps at a rate greater than that at which the bottles pass the chute, and including electrically operated sensing means on said cap chute located at a control station spaced from both the casing and the depositing means a distance to accommodate a plurality of caps, control means in the casing connected to the sensing means by external wires and activated by the sensing means in response to the absence of a cap at the control station for energizing the electric motor and to de-energize the same in response to the presence of a cap at the control station, said external wires arranged to remain connected when the cap chute is moved to the inoperative position.

4. A bottle cap feeder as set forth in claim 1 wherein the drive means includes an electric motor for driving the extractor means to extract the caps at a rate greater than that at which the bottles pass the chute, and including electrically operated sensing means on said cap chute located at a control station spaced from both the casing and the depositing means a distance to accommodate a plurality of caps, control means activated by the sensing means in response to the absence of a cap at the control station for energizing the electric motor and to de-energize the same in response to the presence of a cap at the control station, and the control means including means for delaying the de-energization of the drive means after the actuation of the sensing means for the extraction of a plurality of caps within the capacity of the chute between the control station and the upper end of the chute.

5. A bottle cap feeder as set forth in claim 1 wherein the drive means includes an electric motor for driving the extractor means to extract the caps at a rate greater than that at which the bottles pass the chute, and including electrically operated sensing means on the cap chute located at a control station spaced from both the casing and the depositing means a distance to accommodate a plurality of caps, a relay having a switch in the circuit of the electric motor, an electric control circuit connected to the sensing means for energizing the relay to close the switch and energize the electric motor in response to the absence of a cap at the control station, and a timing condenser in the electric control circuit for holding the relay switch closed for a preselected interval after a cap occupies said control station.

6. A bottle cap feeder as set forth in claim 1 wherein the cap magazine comprises first and second tubes removably mounted on the casing and having an internal size sufficient to accommodate the caps, each tube extending outwardly and upwardly from the casing at an inclination sufficient for the caps to be urged toward the casing by gravity; the extractor means includes first and second extractor assemblies for removing caps from the respective first and second tubes and depositing the same in the cap chute; and the drive means operates for driving the extractor assemblies to extract caps from successive tubes in a continuous cycle.

7. A bottle cap feeder comprising in combination: a casing, a cap chute attached to the casing and extending therefrom in an operative position at a downward inclination sufficient for caps to roll therealong, said cap chute arranged for the edge wise support of the caps in edge-to-edge relationship, depositing means on the cap chute spaced from the casing for releasably retaining the caps in the cap chute and for depositing the caps on the heads of bottles conveyed past the chute, a cap magazine mounted on the casing and having a dispensing end communicating with the cap chute, the casing having an access opening therein and a door removably overlying the access opening, a mounting plate removably secured within the housing, extractor means mounted on the plate for removing a cap from the cap magazine and for depositing the same in the cap chute, drive means mounted on the plate and for driving the extractor means to extract the caps from the cap magazine, said access opening being of sufficient size for removal and replacement of the plate, extractor means, and drive means as a unit therethrough.

8. A bottle cap feeder as set forth in claim 7 including a source of sub-atmospheric air pressure, and wherein the extractor means includes a reciprocable rod, a suction cup mounted on the rod for movement toward and away from said dispensing end, and valve means connected to the source of sub-atmospheric air pressure for connecting said source to the suction cup as it approaches said dispensing end and relieving the same as the suction cup moves away to remove a cap from the magazine and deposit the same in the cap chute; and wherein the drive means includes a crankshaft directly connected to the suction rod for reciprocation thereof.

9. A bottle cap feeder as set forth in claim 8 wherein the drive means includes an electric motor for driving the crankshaft at a speed to extract the caps at a rate greater than that at which the bottles pass the cap chute, and including electrically operated sensing means on the cap chute located at a control station spaced from both the casing and the depositing means a distance to accommodate a plurality of caps, control means in the casing connected to the sensing means by external wires and activated by the sensing means in response to the absence of a cap at the control station for energizing the electric motor and to de-energize the same in response to the presence of a cap at the control station, said cap chute and casing having interfitting clamp means for connecting the cap chute to the casing, said interfitting clamp means being arranged for quick release for swinging movement of the entire chute from said operative position to a compact inoperative position for storing, and said external wires arranged to remain connected when the cap chute is moved to the inoperative position.

References Cited

UNITED STATES PATENTS

| | | | |
|---|---|---|---|
| 2,076,116 | 4/1937 | Brinton | 53—315 |
| 2,574,771 | 11/1951 | Zimmermann et al. | 53—315 X |
| 2,811,126 | 10/1957 | Ford | 192—125 X |

ROBERT C. RIORDON, *Primary Examiner.*

FRANK E. BAILEY, *Examiner.*

R. L. FARRIS, *Assistant Examiner.*